United States Patent [19]

Bonk et al.

[11] Patent Number: 5,769,909
[45] Date of Patent: Jun. 23, 1998

[54] METHOD AND APPARATUS FOR DESULFURIZING FUEL GAS

[75] Inventors: Stanley P. Bonk, Tolland; Thomas J. Corrigan, Vernon; Roger R. Lesieur, Enfield; Richard A. Sederquist, Newington; Donald F. Szydlowski, Ellington, all of Conn.

[73] Assignee: International Fuel Cells Corp., So. Windsor, Conn.

[21] Appl. No.: 656,568

[22] Filed: May 31, 1996

[51] Int. Cl.⁶ .................................. B01J 8/06; B01J 8/04; C10L 3/06
[52] U.S. Cl. .................... 48/127.9; 48/127.7; 48/197 R; 48/198.7; 422/190; 423/244.02
[58] Field of Search ................................ 48/127.7, 127.9, 48/197 R, 198.7; 422/190; 423/244.02

[56] References Cited

U.S. PATENT DOCUMENTS

| | | | |
|---|---|---|---|
| 3,541,729 | 11/1970 | Dantowitz | 48/94 |
| 3,909,299 | 9/1975 | Corrigan | 48/127.9 |
| 4,181,503 | 1/1980 | Lesieur et al. | 48/127.7 |
| 4,629,612 | 12/1986 | van der Wal et al. | 423/244 |
| 4,816,353 | 3/1989 | Wertheim et al. | 429/19 |
| 4,976,747 | 12/1990 | Szydloski et al. | 48/127.9 |
| 5,045,414 | 9/1991 | Bushnell et al. | 429/17 |
| 5,110,559 | 5/1992 | Kondo et al. | 422/190 |
| 5,324,452 | 6/1994 | Allam et al. | 252/373 |
| 5,335,628 | 8/1994 | Dunbar | 122/1 R |
| 5,516,344 | 5/1996 | Corrigan | 48/127.9 |

FOREIGN PATENT DOCUMENTS

| | | |
|---|---|---|
| 0600621 | 8/1994 | European Pat. Off. . |
| 183043 | 7/1995 | Japan . |

*Primary Examiner*—Tae Yoon
*Attorney, Agent, or Firm*—William W. Jones

[57] ABSTRACT

Sulfur and sulfur compounds are removed from a gas stream, such as a hydrocarbon fuel gas stream so as to render the gas stream suitable for use in a fuel cell power plant. Natural gas and recycled hydrogen enters the hydrodesulfurizer assembly at a temperature of about 120° F. The gas stream is heated to a temperature of about 625° F. whereupon it enters a desulfurizing bed formed from a mixture of platinum catalyst deposited on alumina pellets, and a pelletized zinc oxide hydrogen sulfide absorbent. The gas is cooled to an exit temperature of about 525°F. as it passes through the desulfurizer bed. The desulfurizer bed is combined with a shift converter which reduces carbon monoxide in the desulfurized gas stream after the latter has passed through a steam reformer bed.

11 Claims, 1 Drawing Sheet

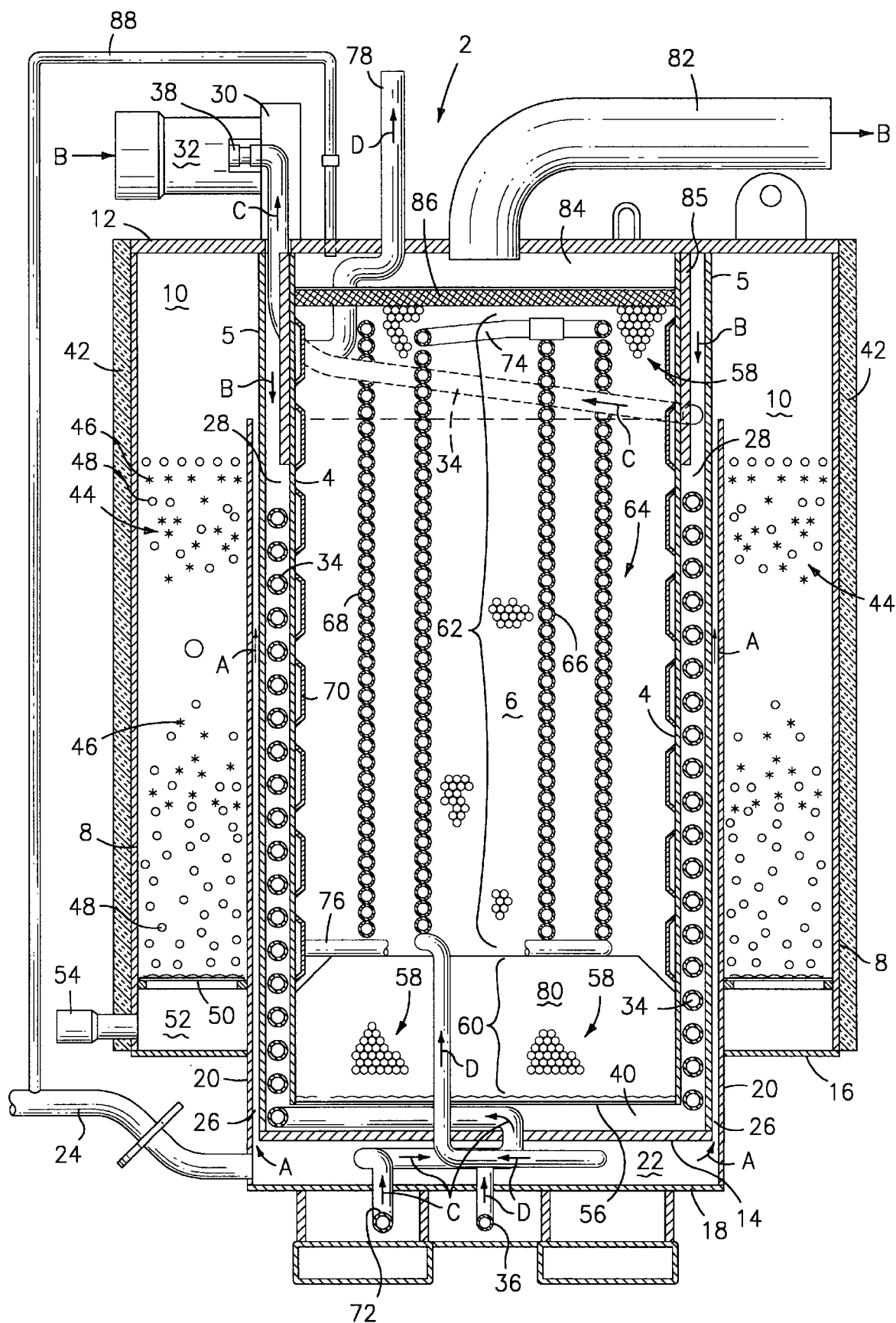

METHOD AND APPARATUS FOR DESULFURIZING FUEL GAS

DESCRIPTION

1. Technical Field

This invention relates to a hydrodesulfurizer assembly which is useful for removing sulfur and sulfur compounds from a fuel gas stream. More particularly, this invention relates to a hydrodesulfurizer assembly which operates in a heat exchange relationship with a process gas shift converter.

2. Background Art

Fuel cell power plants require a source of hydrogen in order to generate electrical power. A conventional method for the production of hydrogen is the reaction of hydrocarbon gases or other fluids with steam in the presence of a catalyst to produce a hydrogen containing gas. Generally, the hydrocarbon that is subjected to the steam reforming process is first desulfurized to avoid poisoning of the reforming catalyst.

Sulfur-containing compounds may be removed from hydrocarbons by several processes. Inorganic sulfur compounds such as hydrogen sulfide may be removed by stripping or absorption. The less stable organic sulfur-containing compounds, i.e., mercaptans and sulfides, may be thermally or catalytically decomposed to inorganic compounds and subsequently removed by absorption or stripping. The more stable organic sulfur containing compounds, i.e., disulfides and thiophenes are decomposed catalytically and are typically removed by a hydrodesulfurization process. In a hydrodesulfurization process the hydrocarbon is treated catalytically in the presence of hydrogen to affect a conversion of the organic sulfur compounds to inorganic compounds which are subsequently removed by absorption or by stripping.

U.S. Pat. Nos. 4,181,503 granted Jan. 1, 1980 to R.R. Lesieur, et al., and 4,976,747 granted Dec. 11, 1990 to D.F. Szydlowski, et al., describe systems for treating a fuel gas stream to remove sulfur and sulfur compounds therefrom, and also to remove carbon monoxide therefrom. Both of these systems involve the use of separate stations or beds through which the gas being treated flows; and intervening heat exchangers to control the temperature of the gas stream which leaves one bed and enters the next. Each of the systems describes the use of separate hydrodesulfurizer beds and hydrogen sulfide absorption beds. The reason for having separate sulfur removal beds is that they operate most efficiently at different temperatures. The systems also describe the inclusion of a separate shift converter bed, where carbon monoxide is converted to carbon dioxide, and a separate heat exchanger to control the temperature of the gas stream entering the shift converter. It will be appreciated that the gas processing systems described in the aforesaid two patents are relatively large and complex. It would be desirable to provide a more compact and less complex integrated system which would serve to desulfurize the gas stream and remove carbon monoxide therefrom. U.S. Pat. No. 3,909,299 granted Sep. 30, 1975 to Thomas J. Corrigan describes a fuel cell system including a fuel gas stream reformer which is coupled with burner air-cooled shift converter. After the shift converter has begun normal operation, heat produced by the exothermic reaction in the shift converter is transferred to the reformer via the preheated burner air. The reformer and the shift converter are arranged in a common housing with the shift converter surrounding the reformer. Although the aforesaid arrangement is practical in small size units, it is cumbersome in large units where large amounts of heat must be transferred and precise temperature control is required.

DISCLOSURE OF THE INVENTION

This invention relates to a fuel gas stream hydrodesulfurizer assembly which is thermally coupled with process gas heat exchangers and a shift converter. The high temperature gas stream from the reformer in the power plant is also used to heat steam which is fed to the reformer assembly. The assembly cools the process gas stream from the steam reformer to temperatures which are suitable for the shift conversion reaction. The shift converter is preferably a two-stage shift converter; however, a single stage shift converter could also be used.

The hydrodesulfurizer bed includes both the necessary catalyst, and also the necessary hydrogen sulfide absorbent all in one bed. The hydrodesulfurizer bed may be a mixed bed of catalyst and absorbent or a layered bed consisting of alternating layers of catalyst and absorbent. Typically, the exit end of the bed will consist solely of absorbent so as to remove the last vestiges or $H_2S$ formed by the catalyst. Additionally, the temperature of the natural gas stream entering the hydrodesulfurizing bed is elevated to a temperature which best promotes the catalytic conversion of sulfur and sulfur compounds to hydrogen sulfide, and the temperature of the natural gas stream, as it passes through and exits the desulfurizing bed, is lowered to a temperature which best promotes the absorption of hydrogen sulfide onto the pelletized zinc oxide bed.

It is therefore an object of this invention to provide a fuel gas stream hydrodesulfurizer and shift converter assembly for removing sulfur, sulfur compounds and carbon monoxide from the fuel gas stream.

It is a further object of this invention to provide an assembly of the character described wherein the temperature of the gas stream at various process stages is used to control the temperature of the hydrodesulfurizer and shift converter beds.

It is another object of this invention to provide an assembly of the character described wherein the hydrodesulfurizer bed is a mixed or layered bed consisting of a noble metal catalyst component which hydrogenerates sulfur and sulfur compounds in the gas stream to form hydrogen sulfide; and a pelletized hydrogen sulfide absorbent which removes hydrogen sulfide from the gas stream.

It is an additional object of this invention to provide an assembly of the character described which utilizes a high temperature process gas stream to transfer heat to the raw fuel gas stream entering the hydrodesulfurizer, and also to transfer heat to steam which flows through the assembly.

BRIEF DESCRIPTION OF THE DRAWING

These and other objects and advantages of the assembly of this invention will become more readily apparent to those skilled in the art from the following detailed description of an embodiment of the invention when taken in conjunction with the accompanying drawing which is a cross-sectional view of a hydrodesulfurizer and shift converter assembly formed in accordance with this invention.

BEST MODE FOR CARRYING OUT THE INVENTION

Referring now to the drawing, there is shown a cross-sectional view of a hydrodesulfurizer and shift converter assembly formed in accordance with this invention. The assembly is denoted generally by the numeral 2 and includes an inner cylindrical housing wall 4 in which the shift converter portion 6 of the assembly 2 is contained. The assembly 2 also includes an outer cylindrical housing wall 8, and a medial cylindrical wall 5. The area between the medial wall 5 and the outer wall 8 contains an annular hydrodesulfurizer portion 10 of the assembly 2 which surrounds the shift converter portion 6. The upper end of the shift converter and the hydrodesulfurizer portions 6 and 10 are closed by a top cover plate 12. The bottom end of the shift converter 6 is closed by a plate 14; and the bottom end of the hydrodesulfurizer 10 is closed by an annular plate 16. An assembly base plate 18 supports an annular wall member 20 which extends upwardly into the hydrodesulfurizer 10. The shift converter 6 is suspended from the top cover plate 12. The base plate 18, annular wall 20, and shift converter plate 14 combine to form a lower plenum 22 which receives a mixture of raw fuel and recycled hydrogen from line 24.

The raw fuel and hydrogen mixture enters the plenum 22 and flows upwardly through an annular passage 26 which is interposed between the walls 5 and 20, and which passage 26 leads to the hydrodesulfurizer 10, as indicated by arrows A. The raw fuel gas-hydrogen mixture enters the plenum at a temperature of about 120° F. The space between the inner wall 4 and the medial wall 5 forms an annular passage 28 which opens into a plenum 30 connected to a line 32 through which high temperature process gas from the power plant reformer (not shown) flows. The process gas enters the plenum at a temperature of about 800° F. and flows downwardly through the passage 28 as indicated by arrows B. Disposed in the passage 28 is a helical steam superheater tube 34 which has an inlet end 36 and an outlet end 38. The tube 34 carries steam which enters the inlet end 72 at a temperature of about 350° F. and exits the outlet end 38 at a temperature of about 700° F. The steam flow path is denoted by the arrows C. The steam flows from the outlet end 38 to the power plant reformer (not shown).

It will be noted that the passages 26 and 28 share the common wall 5 so that the high temperature process gas in passage 28 can raise the temperature of the fuel-hydrogen mixture in the passage 26, as well as giving off heat to the steam in the tube 34. The high temperature process gas contains more heat than can be absorbed by both the flowing steam in the helical coil 34 and the fuel-hydrogen mixture in passage 26. This additional heat is recovered through wall 4 to the heat exchanger plate coil 70 which is positioned on the shift converter side of the wall 4. This ensures that the process gas is cooled to the correct shift converter inlet temperature. Heat removal by the plate coil 70 also helps moderate the temperature of the hot process gas so that the fuel-hydrogen mixture and steam are not heated in excess of their desired exit temperatures. The process gas flows from the passage 28 into a shift converter inlet plenum 40. As it enters the inlet plenum 40, the process gas will have cooled to a temperature of about 375° F. to 400° F.; and the fuel gas-hydrogen mixture will have reached a temperature of about 625° F. by the time it leaves the passage 26 and enters the hydrodesulfurizer chamber 10. The outer wall 8 of the hydrodesulfurizer 10 is insulated by thermal insulation 42 so as to maintain the desired operating temperatures in the chamber 10. The heated fuel gas-hydrogen mixture flows from the passage 26 downwardly through the hydrodesulfurizer bed 44. The bed 44 is composed of a mixture of catalyst pellets 46 and hydrogen sulfide absorbent pellets 48, and is supported on an annular screen 50.

The catalyst composition of the present invention is particularly adapted for use in the hydrogenolysis step of the hydrodesulfurization of low sulfur content hydrocarbon fluids, i.e., those hydrocarbon fluids having a sulfur content of less than or equal to about 50 ppm.

The rate at which the organic sulfur containing compounds in a hydrocarbon fluid undergo hydrogenolysis is accelerated by contact with the catalytically active noble metal of the present invention. The catalyst composition of the present invention catalyzes the hydrogenolysis of organic sulfur containing compounds to yield hydrogen sulfide. Typical hydrogenolysis reactions for a range of organic sulfur compounds are:

$$C_2H_5SH+H_2 \rightarrow C_2H_6+H_2S;$$

$$C_2H_5SSC_2H_5+3H_2 \rightarrow 2C_2H_6+2H_2S;$$

and $$C_4H_4S+4H_2 \rightarrow C_4H_{10}+H_2S.$$

The noble metal catalyst of the present invention may be selected from the platinum group of noble metals, consisting of platinum, palladium and rhodium as well as iridium, osmium and ruthenium, or mixtures thereof. Platinum, palladium and rhodium are the more readily available members of the group, and are preferred for that reason. Platinum is particularly preferred. Generally, higher temperatures favor a higher catlayst activity and a more complete hydrogenolysis reaction or conversion to $H_2S$.

It should be noted that the noble metal catalyst composition of the present invention differs from the transition metal catalysts of the prior art in that the noble metal catalyst composition accelerates the hydrogenolysis of sulfur containing compounds without requiring presulfiding treatment and the noble metal catalyst composition is not deactivated by exposure to low sulfur content hydrocarbon fluids.

In order to present a large catalytically active surface, the noble metal is dispersed in a thin layer on the surface of an inert support. The support must be stable and inert under the conditions of the hydrodesulfurization reaction and provide a high (greater than 50 square meters per gram) specific surface area. The substrate should also be physically robust to the extent necessary to resist abrasion and impact during handling, crushing from such stresses as the weight of surrounding catalyst material, and fracture from internal stresses such as might arise during temperature cycling.

Examples of materials which meet these criteria are the refractory metal oxides and activated charcoal. The refractory metal oxides are preferred. Refractory metal oxides found to be suitable for use as the substrate of the present invention are alumina and lanthanum stabilized alumina. Lanthanum stabilized alumina is commercially available in suitable form (⅛ inch–½ inch diameter pellets, with a length to diameter ratio of one to two and a specific surface area of about 100 square meters per gram). Sources of such material include W.R. Grace & Co. and Engelhard.

The catalytically active noble metal is dispersed on the inert support by any conventional method in the art. Typically, metal salts are deposited on the support from solution and the solvent is evaporated to leave a finely dispersed film of the metal salt on the surface of the support. The amount of platinum dispersed may vary over a wide range, but is generally between 0.02% and 0.5% platinum by weight, based on the weight of the noble metal and substrate material.

The hydrogen sulfide product of the hydrogenolysis reaction must be removed from the hydrocarbon fluid to complete the hydrodesulfurization process. This may be accomplished by stripping the effluent hydrocarbon stream, as in a gas scrubber, or by passing the effluent stream through a bed of hydrogen sulfide absorbent material.

Particles of metal oxides, such as the oxides of iron, copper, nickel or zinc may be used as hydrogen sulfide absorbents. Zinc oxide is the preferred hydrogen sulfide absorbent material. The reaction of zinc oxide with hydrogen sulfide has a particularly high equilibrium constant, strongly favoring the desired forward reaction:

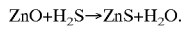

$$ZnO+H_2S \rightarrow ZnS+H_2O.$$

It should be noted that this characteristic is particularly important when water vapor is present in the reactant stream, as is the case in a fuel cell fuel processing unit. Zinc oxide is commercially available in suitable pellet, e.g. $3/16$ inch diameter extrusions or spherical, e.g. $3/8$ inch diameter, form. By mixing the catalyst and hydrogen sulfide absorbent together in a single bed, poisoning of the catalyst by hydrogen sulfide is greatly reduced. Lower temperatures generally favor lower equilibrium $H_2S$ levels at the exit end of the hydrodesulfurizer bed.

As previously noted, the fuel gas-hydrogen mixture flows into the bed 44 at a temperature of about 625° F. which is the optimum catalytic reaction temperature, and as it flows downwardly through the bed 44, its temperature will cool to about 525° F. by the time it passes through the screen 50 into the outlet plenum 52. This reduction in temperature from inlet to exit is the result of cooling by the fuel gas-hydrogen mixture flowing through annulus 26 and heat loss to the environment through insulation 42. The lower temperature is more favorable to the hydrogen sulfide absorption reaction. The desulfurized gas stream flows from the plenum 52 into line 54 which leads to the power plant reformer.

As noted above, the reformed process gas stream returns to the assembly 2 through line 32. The cooled process gas in the shift converter entry plenum 40 flows upwardly through a screen 56 into the shift converter 6. The shift converter 6 contains catalyzed pellets 58. The catalyst on the pellets 58 is operable to cause carbon monoxide in the process gas stream to be converted to carbon dioxide via the following reaction:

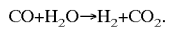

$$CO+H_2O \rightarrow H_2+CO_2.$$

The aforesaid shift conversion reaction is exothermic, and therefore produces heat. The shift converter 6 is preferably a two-stage shift converter which includes a first stage 60 which is adiabatic so that the heat produced therein will not be actively controlled. The temperature of the gas stream leaving the adiabatic section 60 of the shift converter 6 will be elevated from about 375° F to about 500° F. The shift converter 6 also includes a second stage 62 in which the temperature of the gas stream passing therethrough is actively controlled by means of a compound heat exchange coil which is denoted generally by the numeral 64. The heat exchange coil 64 includes an inner portion 66, an outer portion 68 and a shift converter wall portion 70. The coolant enters the inner portion 66 through inlet passage 36, then shifts to the outer portion 68 through transfer pipe 74. The coolant is then transferred to the wall portion 70 via pipe 76. The coolant removes heat not only from the shift converter but also aids in removal of excess heat from the hot process gas before it enters the shift converter. This dual function ensures both the required shift converter inlet temperature and the desired fuel-hydrogen mixture and steam superheat temperatures. This heat exchange relationship between the hot process gas, steam superheater, fuel-hydrogen mixture preheater, and the shift converter cooling stream produces the thermal synergy which allows the design of a compact assembly and ensures optimum operating temperatures for each of its components. The coolant exits the shift converter through line 78. The coolant flow path is designated by arrows D.

The coolant is preferably a pressurized water coolant, which enters the inlet 36 as a single phase water coolant which is pressurized to a pressure in the range of about 100 psi to about 250 psi, and a temperature in the range of about 300° F. to about 350° F. The temperature of the single phase coolant should be about 25° F. below the boiling point of water at that pressure. The coolant stream leaving the shift converter through the line 78 is a boiling phase water-steam mixture which is transferred to a steam accumulator (not shown) in the power plant. The fact that the coolant provides the heat sink necessary to cool the process gas in the shift converter by boiling a pressurized coolant water stream so as not to significantly elevate the temperature of the coolant water stream. The use of a boiling water, constant temperature coolant in the shift converter allows the coolant circulating through the wall portion 70 of the heat exchange coil 64 to assist in lowering the temperature of the process gas stream B. The heat exchange coil 64 is supported by legs 80.

The process gas enters the adiabatic zone 60 at a temperature of about 375° F, leaves the adiabatic section 60 at a temperature of about 500° F., and leaves the actively cooled portion 62 of the catalytic bed at a temperature of about 400° F. via outlet line 82 which leads to the cell stack assembly in the power plant. A layer of thermal insulation 85 protects the cooled gas stream leaving the shift converter from the hotter process gas stream B in the passage 28. It will be noted that the upper end of the shift converter 6 includes a plenum 84 which is bounded by the cover plate 12 and a filter 86 which overlies the catalyst bed 58 and which prevents catalyst dust from becoming entrained in the shift converter effluent stream. A hydrogen recycle line 88 opens into the plenum 84 and into the raw fuel gas inlet line 24. The recycle line 88 is operable to add hydrogen to the raw fuel stream so as to enhance the operation of the hydrodesulfurizer bed.

It will be readily appreciated that by combining a hydrodesulfurizer bed; a high temperature process gas cooling system; a steam heating system; a raw fuel gas entry system; and a shift converter, all in heat exchange relationship with each other, a compact assembly can be realized. The combination of the high temperature process gas cooling system with the combined hydrodesulfurizer catalyst and absorbent bed provides exemplary sulfur conversion and sulfur absorption by providing the necessary temperature gradient in the hydrodesulfurizer, from a higher temperature sulfur conversion inlet section to a lower temperature sulfur absorption exit section in the hydrodesulfurizer bed.

Since many variations and changes of the disclosed embodiment of the invention may be made without departing from the inventive concept, it is not intended to limit the invention otherwise than is required by the appended claims.

What is claimed is:

1. A hydrocarbon fuel gas hydrodesulfurizer assembly comprising:
   a) an inlet manifold for directing a mixture of the fuel gas and hydrogen into the assembly;
   b) a catalyst bed communicating with said inlet manifold so as to receive a stream of the hydrogen and fuel gas, said catalyst bed containing a noble metal catalyst operable to convert sulfur and sulfur compounds in said hydrogen and fuel gas mixture into hydrogen sulfide, and also containing a hydrogen sulfide absorbent for removing hydrogen sulfide from said hydrogen and fuel gas mixture;

c) a heat exchanger section adjacent to said catalyst bed, said heat exchanger section being operable to heat the hydrogen and fuel gas stream prior to the latter entering said catalyst bed;

d) a gas conduit for passing a high temperature reformed process gas stream through said heat exchanger section, said heat exchanger section being operable to cool said process gas stream as the latter flows through said heat exchanger section; and e) a shift converter section adjacent to said heat exchanger section, said shift converter section being operable to receive cooled process gas from said heat exchanger section, and said shift converter section being operable to remove carbon monoxide from said cooled process gas in an exothermic reaction so as to produce heat which is at least partially taken up in said heat exchanger section.

2. The assembly of claim 1 comprising a steam line in said heat exchanger section, said steam line being operable to absorb heat from said high temperature process gas stream.

3. The assembly of claim 2 wherein said catalyst bed is annular in configuration and surrounds said shift converter section.

4. The assembly of claim 3 wherein said heat exchange section is sandwiched between said catalyst bed and said shift converter section.

5. A hydrocarbon fuel gas hydrodesulfurizer assembly comprising:

a) an inlet manifold for directing a mixture of the fuel gas and hydrogen into the assembly;

b) a catalyst bed communicating with said inlet manifold so as to receive a stream of the hydrogen and fuel gas, said catalyst bed containing a nobel metal catalyst operable to convert sulfur and sulfur compounds in said hydrogen and fuel gas mixture to hydrogen sulfide;

c) a heat exchanger section adjacent to said catalyst bed, said heat exchanger section being operable to heat the hydrogen and fuel gas stream prior to the latter entering said catalyst bed;

d) a gas conduit for passing a high temperature reformed process gas stream through said heat exchanger section, said heat exchanger section being operable to cool said process gas stream as the latter flows through said heat exchanger section; and e) a shift converter section adjacent to said heat exchanger section, said shift converter section being operable to receive cooled process gas from said heat exchanger section, and said shift converter section being operable to remove carbon monoxide from said cooled process gas in an exothermic reaction so as to produce heat which is at least partially taken up in said heat exchanger section.

6. The assembly of claim 5 wherein said catalyst bed is annular in configuration and surrounds said shift converter section.

7. The assembly of claim 6 wherein said heat exchange section is sandwiched between said catalyst bed and said shift converter section.

8. A method for removing sulfur and sulfur compounds from a fuel gas stream, said method comprising the steps of:

a) providing a mixture of the fuel gas and hydrogen into the assembly;

b) providing a catalyst bed containing a nobel metal catalyst operable to convert sulfur and sulfur compounds in said hydrogen and fuel gas mixture into hydrogen sulfide;

c) passing said fuel gas and hydrogen mixture through said catalyst bed;

d) providing a heat exchanger section adjacent to said catalyst bed;

e) passing a high temperature reformed process gas stream through said heat exchanger section so as to cool said process gas stream as the latter flows through said heat exchanger section and to concurrently heat said fuel gas and hydrogen mixture;

f) providing a shift converter section adjacent to said heat exchanger section; and g) directing cooled process gas from said heat exchanger section into said shift converter section and removing carbon monoxide from said cooled process gas in an exothermic reaction in said shift converter section so as to produce heat which is at least partially taken up in said heat exchanger section.

9. The method of claim 8 comprising the step of providing a steam line in said heat exchanger section for absorbing heat from said high temperature process gas stream.

10. The method of claim 9 comprising the step of surrounding said shift converter section with said catalyst bed.

11. The method of claim 10 wherein said heat exchange section is sandwiched between said catalyst bed and said shift converter section.

* * * * *